United States Patent [19]

Schäfer et al.

[11] 4,192,925

[45] Mar. 11, 1980

[54] POLYHYDROXYL COMPOUNDS CONTAINING GUANIDINE GROUPS

[75] Inventors: Walter Schäfer, Cologne; Kuno Wagner, Leverkusen; Kurt Findeisen, Odenthal, all of Fed. Rep. of Germany

[73] Assignee: Bayer Aktiengesellschaft, Leverkusen, Fed. Rep. of Germany

[21] Appl. No.: 30,491

[22] Filed: Apr. 16, 1979

Related U.S. Application Data

[62] Division of Ser. No. 889,463, Mar. 23, 1978.

[30] Foreign Application Priority Data

Mar. 31, 1977 [DE] Fed. Rep. of Germany ....... 2714292

[51] Int. Cl.² .............................................. C08G 18/06
[52] U.S. Cl. ................................ 521/163; 260/456 A; 260/464; 260/465 D; 260/465.4; 521/167; 528/49; 528/85; 528/78; 560/26; 560/115; 560/158
[58] Field of Search .................. 521/163, 167; 528/49, 528/85, 78

[56] References Cited

U.S. PATENT DOCUMENTS 2,941,983  6/1960  Smeltz ................................ 560/26
3,824,239  7/1974  Narayan et al. ..................... 521/166

Primary Examiner—Maurice J. Welsh
Attorney, Agent, or Firm—Gene Harsh; Joseph C. Gil; R. Brent Olson

[57] ABSTRACT

This invention relates to new polyols modified by guanidine groups, to a process for the preparation thereof and to the use thereof as starting component for the preparation of preferably foamed polyurethane plastics. The process involves (A) reacting diisocyanato-carbodiimides corresponding to the following general formula:

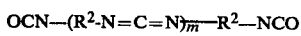

$$OCN-(R^2-N=C=N)_{\overline{m}}-R^2-NCO$$

at a temperature of from about 25° to 130° C., optionally in the presence of an inert solvent, with polyhydroxyl compounds corresponding to the following general formula:

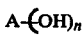

$$A\text{-}(OH)_n$$

in an OH/NCO-ratio of from 1.2:1 to 30:1 to form a polyhydroxyl compound containing carbodiimide groups and (B) completely or partly reacting, at a temperature of from 0° to 150° C., the remaining carbodiimide groups remaining in the production of Step (A), optionally in the presence of an inert solvent, with an amine, amide or hydrazide corresponding to the following general formula:

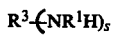

$$R^3\text{-}(NR^1H)_s$$

to form guanidine groups, and (C) distilling off the inert solvent, if used; wherein
  m represents an integer of from 1 to 10; and
  $R^1$ represents a $C_1$–$C_{18}$ aliphatic, $C_4$–$C_{15}$ cycloaliphatic or $C_6$–$C_{15}$ aromatic or araliphatic radical which may optionally contain a double bond and/or be branched and which may optionally be substituted by a group selected from the group of hydroxyl or trifluoromethyl groups, fluorine, chlorine, bromine or iodine;
  $R^2$ represents a divalent aliphatic, cycloaliphatic, aromatic or araliphatic radical having from 4 to 25 carbon atoms obtained by removing the isocyanate groups from a diisocyanate;
  A represents an n-valent radical of the type obtained by removing the hydroxyl groups from a polyhydroxyl compound having a molecular weight of from 62 to 6000;
  n represents an integer of from 2 to 8;
  s represents an integer of from 1 to 3.

1 Claim, No Drawings

POLYHYDROXYL COMPOUNDS CONTAINING GUANIDINE GROUPS

This is a division of application Ser. No. 889,463 filed Mar. 23, 1978.

DESCRIPTION OF THE INVENTION

More particularly, the present invention relates to compounds containing at least two, preferably from 2 to 8 and, with particular preference, from 2 to 4 terminal hydroxyl groups, having a molecular weight of from 400 to 15,000, preferably from 600 to 13,000 and, with particular preference, from 2000 to 10,000 and comprising segments corresponding to the following general formulae:

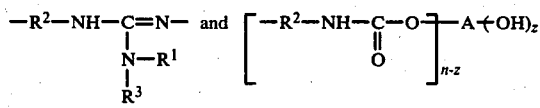

wherein $R^1$ represents hydrogen or a $C_1$–$C_{18}$, preferably $C_1$–$C_6$, aliphatic group, a $C_4$–$C_{15}$, preferably $C_6$–$C_{10}$, cycloaliphatic group, or a $C_6$–$C_{15}$, preferably $C_6$–$C_{10}$, aromatic or araliphatic group which may optionally contain a double bond and/or be branched and which may optionally contain one or two of the following substituents; hydroxyl, mercapto, secondary amino, sulphonic acid ester, phosphoric acid ester, carboxylic ester, siloxane, trifluoromethyl or nitrile groups, fluorine, chlorine, bromine or iodine, or $R^1$ represents one of the radicals:

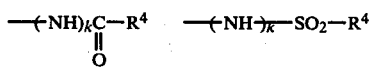

or $R^1$ together with $R^3$ and the nitrogen atom forms a 5- or 6-membered heterocyclic ring optionally containing as additional hetero atoms an oxygen atom or up to two nitrogen atoms;

$R^2$ represents a divalent aliphatic, cycloaliphatic, aromatic or araliphatic radical containing from 4 to 25, preferably from 6 to 15, carbon atoms of the type obtained by removing the isocyanate groups from a diisocyanate;

$R^3$ represents a monovalent or, in the form of a bridge to other guanidine groups, a di-or trivalent (preferably divalent) $C_1$–$C_{18}$, preferably $C_1$–$C_6$, aliphatic group; or a $C_4$–$C_{15}$, preferably $C_6$–$C_{10}$, cycloaliphatic group; a $C_6$–$C_{15}$, preferably $C_6$–$C_{10}$ aromatic or araliphatic group which may optionally contain a double bond and/or be branched and which may optionally contain one or two of the following substituents; hydroxyl, alkoxyl, mercapto, secondary amino, sulphonic acid ester, phosphoric acid ester, carboxylic ester, siloxane, trifluoromethyl or nitrile groups, fluorine, chlorine, bromine or iodine, or $R^3$ represents one of the radicals:

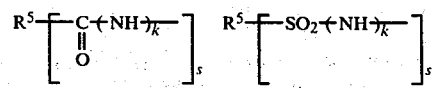

or together with $R^1$, the nitrogen atom and, optionally, the nitrogen atom of another guanidine group forms a 5- or 6-membered heterocyclic ring optionally containing as an additional hetero atom an oxygen or nitrogen atom; represents an aliphatic, cycloaliphatic, araliphatic or aromatic radical containing from 1 to 15, preferably from 1 to 7, carbon atoms;

$R^5$ represents an s-valent aliphatic, cycloaliphatic, araliphatic or aromatic radical containing from 1 to 15, preferably from 1 to 6, carbon atoms;

A represents an n-valent radical of the type obtained by removing the hydroxyl groups from a polyhydroxyl compound having a molecular weight of from 62 to 6,000;

n represents an integer of from 2 to 8, preferably from 2 to 4 and, with particular preference, 2 or 3;

s represents an integer of from 1 to 3, preferably 1 or 2;

z represents an integer having a value of from 0 to (n−1); and k represents 0 or 1.

The present invention also relates to a process for the preparation of polyhydroxyl compounds containing guanidine groups, wherein, in a first step, diisocyanato-carbodiimides corresponding to the following general formula:

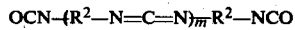

are reacted at a temperature of from about 25° to 130° C., preferably from 90° to 120° C., optionally in the presence of an inert solvent, with polyhydroxyl compounds corresponding to the following general formula:

in an OH/NCO-ratio of from 1.2:1 to 30:1, preferably from 1.5:1 to 15:1 and, with particular preference, about 2:1, to form a polyhydroxy compound containing carbodiimide groups. In a second step, the carbodiimide groups are completely or only partly reacted at a temperature of from 0° C. to 150° C., preferably from 20° to 130° C. and, with particular preference, from 20° to 40° C. (in the case of amines) or from 100° to 130° C. (in the case of amides and Hydrazides), optionally in the presence of an inert solvent, with an amine or amide or hydrazide corresponding to the following general formula:

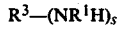

to form guanidine groups. After the reaction, the solvent if used, is distilled off. In the above process m represents an integer of from 1 to 10, preferably 1 or 2; and $R^1$, $R^2$, $R^3$, A, n and s are as defined above.

The preparation of diisocyanatocarbodiimides corresponding to the following general formula:

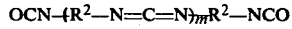

is known and is described, for example, in U.S. Pat. Nos. 2,840,589 and 2,941,966 and by P. W. Campbell and K. C. Smeltz in "Journal of Organic Chemistry", 28, 2069 (1963). Diisocyanatocarbodiimides may also be obtained in a particularly mild manner and free from secondary products by heterogeneous catalysis in accordance with German Offenlegungsschriften Nos. 2,504,400 and 2,552,350. The conversion of diisocyanates into carbodiimides in the presence of very small quantities of phospholine oxide, followed by blocking of the catalyst with acid chlorides, is described in DOS No. 2,653,120.

Starting components suitable for producing the diisocyanatocarbodiimides are aliphatic, cycloaliphatic, araliphatic, aromatic and heterocyclic polyisocyanates of the type described, for example, by W. Siefken in Justus Liebigs Annalen der Chemie, 562, pages 75 to 136. These include for example, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl cyclohexane (DAS No. 1,202,785; U.S. Pat. No. 3,401,190), 2,4- and 2,6-hexahydrotolylene diisocyanate and mixtures of these isomers; hexahydro-1,3- and/or -1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate; naphthylene-1,5-diisocyanate; m- and p-isocyanatophenyl sulphonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Pat. No. 1,092,007 (U.S. Pat. No. 3,152,162); diisocyanates of the type described in U.S. Pat. No. 3,492,330; polyisocyanates containing allophanate groups of the type described, for example, in British Pat. No. 994,890, in Belgian Pat. No. 761,626 and in Published Dutch Patent Application No. 7,102,524; polyisocyanates containing isocyanurate groups of the type described, for example, in U.S. Pat. No. 3,001,973, in German Pat. Nos. 1,022,789; 1,222,067 and 1,027,394 and in German Offenlegungsschriften Nos. 1,929,034 and 2,004,048; polyisocyanates containing urethane groups of the type described, for example, in Belgian Pat. No. 752,261 or in U.S. Pat. No. 3,394,164 polyisocyanates containing acylated urea groups according to German Pat. No. 1,230,778; polyisocyanates containing biuret groups of the type described, for example, in German Pat. No. 1,101,394 (U.S. Pat. Nos. 3,124,605 and 3,201,372) and in British Pat. No. 889,050; polyisocyanates produced by telomerization reactions of the type described, for example, in U.S. Pat. No. 3,654,106; polyisocyanates containing ester groups of the type described, for example, in British Pat. Nos. 965,474 and 1,072,956, in U.S. Pat. No. 3,567,763 and in German Pat. No. 1,231,688; reaction products of the above-mentioned isocyanates with acetals according to German Pat. No. 1,072,385 and polyisocyanates containing polymeric fatty acid residues according to U.S. Pat. No. 3,455,883.

It is particularly preferred to use diisocyanates of the type in which one isocyanate group has a greater tendency towards cabodiimide formation than the other. Examples of such diisocyanates include: 2,4-tolylene diisocyanate; 1-methoxy-2,4-phenylene diisocyanate; 1-chloro-phenyl-2,4-diisocyanate; p-(1-isocyanatoethyl)-phenyl isocyanate; m-(3-isocyanatobutyl)-phenyl isocyanate and 4-(2-isocyanatocyclohexyl-methyl)-phenyl isocyanate.

According to the present invention, polyhydroxyl compounds corresponding to the following general formula:

$$A-(OH)_n$$

include, on the one hand, polyhydric alcohols having a molecular weight of from 62 to approximately 250 and, on the other hand, polyester and polyether polyols having a molecular weight of from 150 to 6000, preferably from 500 to 5000 and, with particular preference, from 1000 to 4000, of the type known for the preparation of homogeneous and cellular polyurethane plastics.

Examples of such compounds include: ethylene glycol; 1,2- and 1,3-propylene glycol; 1,4- and 2,3-butylene glycol; 1,5-pentane diol; 1,6-hexane diol; 1,8-octane diol; neopentyl glycol; 1,4-bis-hydroxymethyl cyclohexane; 2-methyl-1,3-propane diol; glycerol; trimethylol propane, 1,2,6-hexane triol, trimethylol ethane, pentaerythritol, quinitol, mannitol, sorbitol, diethylene glycol, triethylene glycol, tetraethylene glycol, polyethylene glycols having a molecular weight of up to 400, dipropylene glycol, polypropylene glycols having a molecular weight of up to 400, dibutylene glycol, polybutylene glycols having a molecular weight of up to 400, methylglycoside, diethanolamine-N-methyl phosphonic acid ester, castor oil, diethanolamine, N-methyl ethanolamine and triethanolamine.

Suitable polyesters containing hydroxyl groups include, for example, reaction products of polyhydric, preferably dihydric, and, optionally, even trihydric, alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic cycloaliphatic, aromatic and/or heterocyclic and may optionally be substituted, for example by halogen atoms, and/or may be unsaturated.

Examples of such polycarboxylic acids include: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethylester and terephthalic acid-bisglycol ester. Suitable polyhydric alcohols include, for example, ethylene glycol, 1,2- and 1,3-propylene glycol; 1,4- and 2,3-butylene glycol; 1,6-hexane diol; 1,8-octane diol; neopentyl glycol; cyclohexane dimethanol (1,4-bis-hydroxymethylcyclohexane); 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycols; dipropylene glycol; polyproplene glycols; dibutylene glycol and polybutylene glycols. The polyesters may also contain terminal carboxyl groups. Polyesters of lactones, for example ε-caprolactone, or hydroxy carboxylic acids, for example ω-hydroxycaproic acid, may also be used.

The polyethers containing at least two, generally from two to eight preferably 2 or 3 hydroxyl groups which may be used in accordance with the present invention are also known and are obtained, for example, by polymerizing epoxides, such as ethylene oxide, propylene oxide, butylene oxide, tetrahydrofuran, styrene oxide or epichlorhydrin, on their own, for example in the presence of BF$_3$, or by adding these epoxides, optionally in admixture or successively, with starter components containing reactive hydrogen atoms. Such starter compounds include water, ammonia, alcohols or amines, for example ethylene glycol, 1,3- or 1,2-propylene glycol, trimethylol propane, 4,4'-dihydroxydiphenyl propane, aniline, ethanolamine or ethylene diamine. Sucrose polyethers of the type described for example, in German Auslegeschriften Nos. 1,176,358 and 1,064,938 may also be used in accordance with the present invention. In many cases, it is preferred to use polyethers of the type which predominantly contain primary OH-groups (up to 90%, by weight, based on all the OH-groups present in the polyether). Polyethers modified by vinyl polymers of the type obtained, for example, by polymerizing styrene and acrylonitrile in the presence of polyethers (U.S. Pat. Nos. 3,383,351; 3,304,273; 3,523,093 and 3,110,695; German Pat. No. 1,152,536) are also suitable, as are polybutadienes containing OH-groups.

Among the polythioethers, particular reference is made to the condensation products of thiodiglycol on its own and/or with other glycols, dicarboxylic acids, formaldehyde, aminocarboxylic acids or amino alcohols. Depending upon the co-components, the products are polythio mixed ethers, polythioether esters or polythioether ester amides.

Suitable polyacetals are, for example, the compounds obtainable from the reaction of glycols, such as diethylene glycol, triethylene glycol, 4,4'-dioxethoxy diphenyl dimethyl methane and hexane diol, with formaldehyde. Polyacetals suitable for use in accordance with the present invention may also be obtained by the polymerization of cyclic acetals.

Polycarbonates containing hydroxyl groups suitable for use in accordance with the present invention are those known compounds which may be prepared, for example, by reacting diols, such as 1,3-propane diol, 1,4-butane diol and/or 1,6-hexane diol, diethylene glycol, triethylene glycol or tetraethylene glycol, with diaryl carbonates, for example diphenyl carbonate, or with phosgene.

The polyester amides and polyamides include, for example, the predominantly linear condensates obtained from polybasic saturated and unsaturated carboxylic acids or the anhydrides thereof and polyfunctional saturated and unsaturated amino alcohols, diamines, polyamines and mixtures thereof.

Polyhydroxyl compounds already containing urethane or urea groups and optionally modified natural polyols, such as castor oil, carbohydrates or starch, may also be used. Addition products of alkylene oxides with phenol-formaldehyde resins or even with urea-formaldehyde resins may also be used in accordance with the present invention.

Representatives of these compounds which may be used in accordance with the present invention are described, for example, in High Polymers, Vol. XVI, "Polyurethanes, Chemistry and Technology", by Saunders-Frisch, Interscience Publishers, New York, London, Vol. I, 1962, pages 32 to 42 and pages 44 to 54 and Vol. II, 1964, pages 5-6 and 198-199, and in Kunststoff-Handbuch, Vol. III, Vieweg-Höchtlen, Carl-Hanser Verlag, Munich, 1966, for example on pages 45 to 71.

According to the present invention, however, it is also possible to use polyhydroxyl compounds which contain high molecular weight polyadducts or polycondensates in finely disperse or dissolved form. Such modified polyhydroxyl compounds are obtained by carrying out polyaddition reactions (for example reactions between polyisocyanates and amino-functional compounds) or polycondensation reactions (for example between formaldehyde and phenols and/or amines) in situ in the above-mentioned compounds containing hydroxyl groups. Such processes are described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. However, it is also possible, in accordance with U.S. Pat. No. 3,869,413 or German Offenlegungsschrift No. 2,550,860, to mix a prepared aqueous polymer dispersion with a polyhydroxyl compound and then to remove the water from the mixture.

According to the present invention, preferred polyols are polypropylene glycols, trimethylol propane- or glycerol-started copolymers of propylene oxide and ethylene oxide and also polyesters based on adipic acid, 1,4-butane diol, diethylene glycol, 1,6-hexane diol and/or neopentyl glycol.

In the first step of the process according to the present invention, the diisocyanatocarbodiimides corresponding to the following general formula:

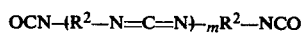

are reacted with the polyhydroxyl compounds corresponding to the following general formula:

in an OH/NCO-ratio of from 1.2:1 to 30:1, preferably from 1.5:1 to 15:1 and, with particular preference, about 2:1, at temperatures of from about 25° to 130° C., preferably from 90° to 120° C. The progress of the reaction may readily be followed by IR-spectroscopy from the disappearance of the isocyanate band at 2220 cm$^{-1}$.

After all the isocyanate groups have reacted, an amine, amide or hydrazide corresponding to the following general formula:

is added at a temperature of from 0° to 150° C., preferably from 20° to 130° C. and, with particular preference, from 20° to 40° C. in the case of amines and from 100° to 130° C. in the case of amides or hydrazides. The amino or amido groups are preferably added in a quantity substantially equivalent to the carbodiimide groups. However, it is also possible, in order to retain some of the carbodiimide groups, to add only a less than equivalent amount of amine or amide (from about 25 to 95% of the equivalent quantity). The free carbodiimide groups which are still present in that case may optionally be reacted with other reactants, for example water or carboxylic acids.

According to the present invention, it is preferred to use amines, amides or hydrazides wherein R$^3$ represents a monovalent or (in the form of a bridge to other guanidine groups) divalent or trivalent, preferably divalent, C$_1$–C$_6$ aliphatic, C$_6$–C$_{10}$ cycloaliphatic or C$_6$–C$_{10}$ aromatic radical which may optionally contain a double bond and/or be branched and which may be substituted by hydroxyl, secondary amino, siloxane or nitrile groups, or a radical

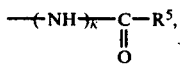

or a radical $-(NH)_k-SO_2R^5$, wherein $R^5$ preferably represents a $C_6$ or $C_7$ aromatic or $C_2-C_5$ aliphatic radical or, together with $R^1$ and the nitrogen atom, $R^3$ forms a heterocyclic ring. Examples of such rings are the pyrrolidine, pyrrolidone, piperidine, piperazine, morpholine, pyrazoline, pyrazolidine, imidazoline, imidazolidine and the triazine ring.

$R^1$ preferably represents hydrogen or a $C_1-C_6$ aliphatic radical which may optionally contain a double bond and/or be branched and which may be substituted by a hydroxyl, secondary amino or nitrile group or, together with $R^3$ and the nitrogen atom, forms a heterocyclic ring.

Examples of amines and amides suitable for use in accordance with the present invention include: dimethylamine, diethylamine, dipropylamine, 3-aminopropyl triethoxy silane, N-cyclohexylaminomethyl triethoxy silane, pyrrolidine, triazine, pyrrolidone, pyrrole, imidazole, morpholine, piperazine, imidazoline, imidazolidine, pyrazole, pyrazoline, pyrazolidine, methylamine, ethylamine, n-butylamine, di-n-butylamine, t-butylamine, di-t-butylamine, cyclohexylamine, N-methyl-aniline, diallylamine, diethanolamine, N-methyl ethanolamine, methyl-(2-aminoethyl)-ether, 3-(methylamino)-propionic acid nitrile, ethylene diamine, hexamethylene diamine, isophorone diamine, ε-caprolactam, δ-valerolactam, γ-butyro lactam, formamide, acetic acid amide, acetic acid hydrazide, propionic acid hydrazide, acrylic acid amide, benzene sulphonic acid amide, N-methyl benzene sulphonic acid amide and benzene sulphonic acid hydrazide.

The process according to the present invention may optionally be carried out in the presence of inert solvents, for example benzene, toluene, xylene, chlorobenzene, dichlorobenzene and mixtures thereof with sterically hindered alcohols, such as t-butanol, methylene chloride, chloroform, dimethyl formamide or dioxane. In order to isolate the pure product, the solvent used, if any, may be subsequently removed.

It is known from the literature that carbodiimides react with alcohols to form isourea compounds. Accordingly, it may be regarded as surprising that virtually no addition of hydroxyl groups with the carbodiimide group to form crosslinked, insoluble products occurs in the process according to the present invention. Instead, an intermediate product which is relatively stable in storage is formed.

It is also known from the literature that guanidines are excellent catalysts for polyisocyanate polyaddition reactions. The products according to the present invention, particularly those containing amines added with the carbodiimide group, also show excellent catalytic activity.

One advantage of the products according to the present invention over conventional catalysts is that they are fixedly built into the polyurethane plastic, so that the catalyst is prevented from undesirably exuding from the polyurethane which may give rise to the release of unpleasant pungent odors.

The modified polyhydroxyl compounds according to the present invention are valuable starting components for the preparation of polyurethane plastics, preferably foams. Polyurethane foams prepared from them show greatly improved fire resistance and excellent properties.

Accordingly, the present invention also relates to a process for the preparation of optionally cellular polyurethane plastics comprising reacting:
  (a) polyisocyanates, with
  (b) polyhydroxyl compounds; and, optionally,
  (c) other compounds containing isocyanate-reactive groups; optionally in the presence of
  (d) blowing agents, catalysts and other known additives; wherein the polyols according to the present invention which are modified by acyl urea groups are used as component (b).

Suitable isocyanates include any of the abovementioned diisocyanates and also the distillation residues containing isocyanate groups obtained in the commercial production of isocyanates, optionally in solution in one or more monomeric polyisocyanates, as well as polyphenyl-polymethylene polyisocyanates of the type obtained by condensing aniline with formaldehyde, followed by phosgenation. In addition to the polyhydroxyl compounds of the present invention, it is also possible to use the above-mentioned unmodified polyols and the conventional diamine chain-extending agents.

Aliphatic diamines suitable for use in accordance with the present invention include, for example, ethylene diamine; 1,4-tetramethylene diamine; 1,11-undecamethylene diamine; 1,12-dodecamethylene diamine and mixtures thereof; 1-amino-3,3,5-trimethyl-5-aminomethyl cyclohexane; 2,4- and 2,6-hexahydrotoluene diamine and mixtures thereof; perhydro-2,4′- and -4,4′-diamino-diphenyl methane; p-xylylene diamine; bis-(3-aminopropyl)-methylamine, etc. According to the present invention, it is also possible to use hydrazine and substituted hydrazines, for example methyl hydrazine, N,N′-dimethyl hydrazine and homologues thereof. Also suitable are acid dihydrazides such as carbodihydrazide, oxalic acid dihydrazide, the dihydrazides of malonic acid, succinic acid, glutaric acid, adipic acid, β-methyl adipic acid, sebacic acid, hydracrylic acid and terephthalic acid, semicarbazido-alkylene-hydrazides, such as β-semicarbazidopropionic acid hydrazide (DOS No. 1,770,591), semicarbazidoalkylene carbazinic esters, such as 2-semicarbazidoethyl carbazinic ester (DOS No. 1,918,504) or even aminosemicarbazide compounds, such as β-aminoethyl semicarbazidocarbonate (DOS No. 1,902,931).

Examples of aromatic diamines are bis-anthranilic acid esters according to German Offenlegungsschriften Nos. 2,040,644 and 2,160,590; 3,5- and 2,4-diaminobenzoic acid esters according to DOS No. 2,025,900; the diamines containing ester groups described in German Offenlegungsschriften Nos. 1,803,635; 2,040,650 and 2,160,589; 3,3′-dichloro-4,4′-diaminodiphenyl methane; tolylene diamine; 4,4′-diaminodiphenyl methane; and 4,4′-diaminodiphenyl disulphide.

According to the present invention, other suitable chain-extenders include compounds such as 1-mercapto-3-aminopropane; optionally substituted amino acids such as glycine, alanine, valine, serine and lycine; and optionally substituted dicarboxylic acids such as succinic acid, adipic acid, phthalic acid, 4-hydroxyphthalic acid and 4-aminophthalic acid.

It is also possible to use compounds which are monofunctional with respect to isocyanates in proportions of from 0.01 to 10%, by weight, based on the polyurethane solids, as so-called "chain-terminators". Such monofunctional compounds are, for example, monoamines, such as butyl- and dibutyl-amine, octylamine, stearylamine, N-methylstearylamine, pyrrolidine, piperidine and cyclohexylamine, monohydric alcohols, such as butanol, 2-ethyl hexanol, octanol, dodecanol, the various amyl alcohols, cyclohexanol, ethylene glycol monoethyl ether, etc.

According to the present invention water and/or readily volatile organic substances may be used as blowing agents. Suitable organic blowing agents include acetone, ethyl acetate; halogen-substituted alkanes such as methylene chloride, chloroform, ethylidene chloride, vinylidene chloride, monofluorotrichloromethane, chlorodifluoromethane, dichlorodifluoromethane; and butane, hexane, heptane or diethyl ether. A blowing effect may also be obtained by adding compounds which decompose at temperatures above room temperature giving off gases such as nitrogen, for example azo-compounds, such as azoisobutyronitrile. Other examples of blowing agents and information on the use of blowing agents may be found in Kunststoff-Handbuch, Vol. VII, by Vieweg and Höchtlen. Carl-Hanser-Verlag, Munich 1966, for example on pages 108 and 109, 453 to 455 and 507 to 510.

According to the present invention, catalysts are also frequently used. Examples of suitable known catalysts include tertiary amines, such as triethylamine, tributylamine, N-methyl morpholine, N-ethyl morpholine, N-cocomorpholine, N,N,N',N'-tetramethyl ethylene diamine, 1,4-diazabicyclo-(2,2,2)-octane, N-methyl-N'-dimethylaminoethyl piperazine, N,N-dimethyl benzylamine, bis-(N,N-diethylaminoethyl)-adipate, N,N-diethyl benzylamine, pentamethyl diethylene triamine, N,N-dimethyl cyclohexylamine, N,N,N'N'-tetramethyl-1,3-butane diamine, N,N-dimethyl-$\beta$-phenylethylamine, 1,2-dimethylimidazole and 2-methylimidazole. Other suitable catalysts are known Mannich bases of secondary amines, such as dimethylamine, and aldehydes, preferably formaldehyde, or ketones, such as acetone, methylethyl ketone or cyclohexanone, and phenols, such as phenol, nonylphenol or bisphenol.

Examples of tertiary amine catalysts containing isocyanate-reactive hydrogen atoms include: triethanolamine, triisopropanol-amine, N-methyl diethanolamine, N-ethyl diethanolamine, N,N-dimethyl ethanolamine, and the reaction products thereof with alkylene oxides, such as propylene oxide and/or ethylene oxide.

Other suitable catalysts are silaamines having carbon-silicon bonds of the type described, for example, in German Patent 1,229,290 (corresponding to U.S. Pat. No. 3,620,984). These include compounds such as 2,2,4-trimethyl-2-silamorpholine and 1,3-diethyl aminomethyl tetramethyl disiloxane.

Other suitable catalysts are nitrogen-containing bases, such as tetraalkyl ammonium hydroxides; alkali metal hydroxides, such as sodium hydroxide; alkali metal phenolates, such as sodium phenolate; and alkali metal alcoholates, such as sodium methylate. Hexahydrotriazines may also be used as catalysts.

According to the present invention, organometallic compounds, especially organo-tin compounds, may also be used as catalysts.

Preferred organo-tin compounds are tin(II) salts of carboxylic acids, such as tin(II) acetate, tin(II)octoate, tin(II)ethyl hexoate and tin(II)laurate, and the tin(IV) compounds, such as dibutyl tin oxide, dibutyl tin dichloride, dibutyl tin diacetate, dibutyl tin dilaurate, dibutyl tin maleate or dioctyl tin diacetate. It is, of course, possible to use the above-mentioned catalysts in the form of mixtures.

Further representatives of catalysts suitable for use in accordance with the present invention and details on the way in which the catalysts work may be found in Kunststoff-Handbuch, Vol. VII, by Vieweg and Höchtlen, Carl-Hanser-Verlag, Munich, 1966, for example on pages 96 to 102.

The catalysts are generally used in quantities of from about 0.001 to 10%, by weight, based on the quantity of compounds containing at least two isocyanate-reactive hydrogen atoms and having a molecular weight of from 400 to 10,000.

According to the present invention, surface-active additives, such as emulsifiers and foam stabilizers, may also be used. Examples of emulsifiers are the sodium salts of castor oil sulphonates or salts of fatty acids with amines, such as diethyl amine/oleic acid or diethanolamine/stearic acid. Alkali metal or ammonium salts of sulphonic acids, such as those of dodecyl benzene sulphonic acid or dinaphthyl methane disulphonic acid, or of fatty acids, such as ricinoleic acid, or of polymeric fatty acids, may also be used as surface-active additives.

Particularly suitable foam stabilizers are polyether siloxanes, especially water-soluble types. These compounds generally have a structure in which a copolymer of ethylene oxide and propylene oxide is attached to a polydimethyl siloxane radical. Foam stabilizers of this type are described, for example, in U.S. Pat. Nos. 2,834,748; 2,917,480 and 3,629,308.

According to the present invention, it is also possible to use reaction retarders, for example substances which are acid in reaction, such as hydrochloric acid or organic acid halides; known cell regulators, such as paraffins or fatty alcohols or dimethyl polysiloxanes; pigments or dyes; known flameproofing agents, for example trischlorethyl phosphate, tricresyl phosphate or ammonium phosphate and polyphosphate; stabilizers against the effects of ageing and weathering; plasticizers; substances having fungistatic and bacteriostatic effects; and fillers such as barium sulphate, kieselguhr, carbon black or prepared chalk.

Other examples of the surface-active additives and foam stabilizers optionally used in accordance with the present invention and of cell regulators, reaction retarders, stabilizers, flameproofing substances, plasticizers, dyes and fillers, substances having fungistatic and bacteriostatic effects and also details on the way in which these additives are to be used and how they work, may be found in Kunststoff-Handbuch, Vol. VII, published by Vieweg and Höchtlen, Carl-Hanser-Verlag, Munich, 1966, for example on pages 103 to 113.

According to the present invention, the reaction components may be reacted by the known one-shot process, by the prepolymer process or by the semi-prepolymer process, in many cases using machines of the type described, for example, in U.S. Pat. No. 2,764,565. Particulars of processing equipment suitable for use in accordance with the present invention may be found, for example, on pages 121 and 205 of Kunststoff-Handbuch, Vol. VII, published by Vieweg and Hochtlen, Carl-Hanser-Verlag, Munich 1966.

In the production of foams, the foaming reaction is preferably carried out in molds in accordance with the present invention. To this end, the reaction mixture is introduced into a mold. Suitable mold materials are metals, for example aluminum, or plastics, for example epoxide resins. Inside the mold, the foamable reaction mixture foams and forms the molding. In-mold foaming may be carried out in such a way that the molding has a cellular structure at its surface, or even in such a way that the molding has a compact skin and a cellular core. According to the present invention, it is possible in this connection to introduce such a quantity of foamable reaction mixture into the mold that the foam formed just fills the mold. However, it is also possible to introduce into the mold more foamable reaction mixture than is required for filling the mold with foam. This technique is known as "overcharging" and is known, for example, from U.S. Pat. Nos. 3,178,490 and 3,182,104.

Known "external release agents", such as silicone oils, are frequently used for in-mold foaming. However, it is also possible to use so-called "internal release agents", optionally in admixture with external release agents, such as are known, for example, from German Offenlegungsschriften Nos. 2,121,670 and 2,307,589.

According to the present invention, cold-hardening foams may also be produced (cf. British Patent No. 1,162,517, German Offenlegungsschrift No. 2,153,086).

However, it is, of course, also possible to produce foams by block foaming or by the known laminator process.

EXAMPLES

EXAMPLE 1

480 g (0.1 mol) of a polyether of trimethylol propane, propylene oxide and ethylene oxide having an OH-number of 35 are dehydrated by heating to 120° C. in a vacuum of 12 Torr and subsequently reacted with 15.2 g (0.05 mol) of bis-(3-isocyanato-4-methylphenyl)-carbodiimide at 120° C. After all the isocyanate groups have reacted, which takes about 2 hours, the reaction mixture is heated to 25° C. and dimethylamine is introduced until all the carbodiimide groups have reacted to form guanidine groups which may readily be ascertained by IR-Spectroscopy from the disappearance of the carbodiimide band at 2120 cm$^{-1}$. The polyol containing guanidine groups has a viscosity $\eta_{24}$ of 7260 cP (molecular weight approximately 10,000).

EXAMPLE 2

480 g (0.1 mol) of a polyether of trimethylol propane, propylene oxide and ethylene oxide having an OH-number of 35 are dried by heating for 30 minutes at 120° C. under a vacuum of 12 Torr and subsequently mixed with 15.2 g (0.05 mol) of bis-(3-isocyanato-4-methylphenyl)-carbodiimide dissolved in 100 ml of xylene. After all the isocyanate groups have reacted, which takes about 3 hours, dimethylamine is introduced at 25° C. until all the carbodiimide groups have reacted forming guanidine groups. Following removal of the solvent, the polyol containing guanidine groups has a viscosity $\eta_{25}$ of 7700 cP.

EXAMPLE 3

200 g (0.1 mol) of a polypropylene glycol having an OH-number of 56 are dried by heating to 120° C. in a vacuum of 12 Torr, followed by the addition of 15.2 g (0.05 mol) of bis-(3-isocyanato-4-methylphenyl)-carbodiimide. After all the isocyanate groups have reacted, 50 g of the reaction product are mixed with 11 g (0.05 mol) of 3-aminopropyl triethoxy silane at 25° C., followed by addition of the remainder of the reaction product of the polyether and bis-(3-isocyanato-4-methylphenyl)-carbodiimide. The polyol modified with guanyl propyl siloxyl groups, which swells on the addition of a little water, has a viscosity $\eta_{25}$ of 11,000 cP (molecular weight approximately 4500).

EXAMPLE 4

960 g (0.2 mol) of a polyether of trimethylol propane, propylene oxide and ethylene oxide having an OH-number of 35 are dehydrated by heating to 120° C. in a vacuum of 12 Torr and subsequently reacted with 30.4 g (0.1 mol) of bis-(3-isocyanato-4-methylphenyl)-carbodiimide at 120° C. After all the isocyanate groups have reacted, which takes about 2 hours, 8.4 g (0.1 mol) of 3-methylaminopropionic acid nitrile are added at 55° C. The polyol formed has a viscosity $\eta_{24}$ of 10700 (molecular weight approximately 10,000).

EXAMPLE 5

960 g (0.2 mol) of a polyether of trimethylol propane, propylene oxide and ethylene oxide having an OH-number of 35 are dehydrated by heating to 120° C. in a vacuum of 12 Torr and subsequently reacted with 30.4 g (0.1 mol) of bis-(3-isocyanato-4-methylphenyl)-carbodiimide at 120° C. After all the isocyanate groups have reacted, which takes about 2 hours, 10.5 g (0.1 mol) of diethanolamine are added after cooling to 25° C., resulting in the formation of a polyol modified by dihydroxyethyl guanidine groups. The product has a viscosity $\eta_{24}$ of 4300 cP (molecular weight approximately 10,000).

EXAMPLE 6

960 g (0.2 mol) of a polyether of trimethylol propane, propylene oxide and ethylene oxide having an OH-number of 35 are dehydrated by heating to 120° C. in a vacuum of 12 Torr and subsequently reacted with 30.4 g (0.1 mol) of bis-(3-isocyanato-4-methylphenyl)-carbodiimide at 120° C. After all the isocyanate groups have reacted, which takes about 2 hours. 12.1 g (0.1 mol) of 2-amino-2-(hydroxymethyl)-propane diol are added at 90° C. The polyol formed, modified by hydroxy guanidine groups, has a viscosity $\eta_{24}$ of 10650 cP (molecular weight approximately 10,000).

EXAMPLE 7

111 g (0.5 mol) of 1-isocyanato-3,3,5-trimethyl-5-isocyanatomethyl cyclohexane are subjected to carbodiimide formation at 150° C. with 0.3 ml of a mixture of 1-methyl-1-phospha-2-cyclopentene-1-oxide and 1-methyl-1-phospha-3-cyclopentene-1-oxide until 6 liters of carbon dioxide have been formed. 20 g (0.05 mol, based on isocyanate groups) of the diisocyanatocarbodiimide formed are added to 200 g (0.1 mol) of a polypropylene glycol having an OH-number of 56 which was dried by heating to 120° C. in a vacuum of 12 Torr.

After the isocyanate groups have reacted at from 110° to 120° C., dimethylamine is introduced at 25° C. until no more carbodiimide groups may be detected in the IR-spectrum. The product has a viscosity of 9400 cP (molecular weight approximately 4500).

EXAMPLE 8

100 g (0.4 mol) of 4,4'-diisocyanatodiphenyl methane dissolved in 100 g of xylene are subjected to carbodiimide formation at 120° C. with 8 g of the insoluble catalyst containing phosphine oxide groups according to Example 1a of DOS No. 2,552,350 until 3.5 liters of carbon dioxide have been formed. The catalyst is then separated off by filtration. 70 g (0.2 mol, based on isocyanate groups) of the filtrate are mixed with 960 g (0.2 mol) of a polyether of trimethylol propane, propylene oxide and ethylene oxide having an OH-number of 35 which was dried by heating to 120° C. in a vacuum of 12 Torr.

After the isocyanate groups have reacted at from 110° to 120° C., the reaction mixture is cooled to 80° C. and 9.7 g (0.1 mol) of dipropylamine are added. The polyhydroxyl ether formed, modified with dipropyl guanidine groups, has a viscosity $\eta_{24}$ of 19375 cP.

EXAMPLE 9

172 g (0.1 mol) of a polyester of adipic acid, 1,6-hexane diol and neopentyl glycol having an OH-number of 66 are dried by heating to 120° C. in a vacuum of 12 Torr and subsequently mixed with 15.2 g (0.05 mol) of bis-(3-isocyanato-4-methylphenyl)-carbodiimide. After the isocyanate groups have reacted at from 110° to 120° C., dimethylamine is introduced at 25° C. until all the carbodiimide groups have reacted forming guanidine groups. A wax-like polyol containing guanidine groups is obtained (molecular weight approximately 3800).

EXAMPLE 10

1440 g (0.3 mol) of a polyether of trimethylol propane, propylene oxide and ethylene oxide having an OH-number of 35 are dehydrated by heating to 120° C. in a vacuum of 12 Torr and subsequently reacted with 45.6 g (0.15 mol) of bis-(3-isocyanato-4-methylphenyl)-carbodiimide at 120° C. After all the isocyanate groups have reacted, which takes about 2 hours, 25.8 g (0.15 mol) of benzene sulphonic acid hydrazide dissolved in 100 ml of dioxane are added at room temperature. The polyol formed, modified with sulphonyl amino guanidine groups, has a viscosity $\eta_{24}$ of 15700 cP (molecular weight approximately 10,000).

EXAMPLE 11

200 g (0.1 mol) of a polyether of propylene glycol and propylene oxide having an OH-number of 56 are dehydrated by heating to 120° C. in a vacuum of 12 Torr and subsequently reacted with 15.2 g (0.05 mol) of bis-(3-isocyanato-4-methylphenyl)-carbodiimide at 120° C. After all the isocyanate groups have reacted, which takes about 2 hours, 8.55 g (0.05 mol) of toluene sulphonic acid amide dissolved in 500 ml of dimethyl formamide are added at 120° C. After the carbodiimide band has disappeared, which takes about 2.5 hours, the solution of the polyol containing sulphonyl guanidine groups has a viscosity $\eta_{24}$ of 435 cP (molecular weight 4500).

EXAMPLE 12

200 g (0.1 mol) of a polyether of propylene glycol and propylene oxide having an OH-number of 56 are dehydrated by heating to 120° C. in a vacuum of 12 Torr and subsequently reacted at 120° C. with 15.2 g (0.05 mol) of bis-(3-isocyanato-4-methylphenyl)-carbodiimide dissolved in 100 ml of xylene. After all the isocyanate groups have reacted, 4.25 g (0.05 mol) of pyrrolidone dissolved in 50 ml of xylene are added at 120° C. The resulting solution of a polyol containing acyl guanidine groups has a viscosity $\eta_{24}$ of 320 cP (molecular weight approximately 4500).

EXAMPLE 13

15.2 g (0.2 mol) of 1,2-propane diol dissolved in 60 ml of dimethyl formamide are reacted at 80° C. with 30.4 g (0.1 mol) of bis-(3-isocyanato-4-methylphenyl)-carbodiimide dissolved in 250 ml of toluene. After all the isocyanate groups have reacted, 8 g (0.11 mol) of diethylamine are added at room temperature. After the solvent has been removed, a solid polyol modified with N,N-diethyl guanidine groups and having a melting point of 65° C. is obtained (molecular weight approximately 550).

EXAMPLE 14

15.2 g (0.2 mol) of 1,2-propane diol, dissolved in 60 ml of dimethyl formamide, are reacted at 80° C. with 30.4 g (0.1 mol) of bis-(3-isocyanato-4-methylphenyl)-carbodiimide dissolved in 250 ml of toluene. After all the isocyanate groups have reacted, 4.3 g (0.05 mol) of piperazine, dissolved hot in 25 ml of dioxane, are added at room temperature. After the solvent has been removed, a polyol modified with N,N,N',N'-diethylene diguanidine groups and having a melting point of 93° C. is obtained (molecular weight approximately 1000).

What is claimed is:

1. A process for the preparation of optionally cellular polyurethane plastics comprising reacting:
(a) polyisocyanates, with
(b) polyhydroxyl compounds; and, optionally,
(c) other compounds containing isocyanate-reactive groups; optionally in the presence of
(d) blowing agents; catalysts and other known agents; wherein component (b) comprises compounds containing at least two terminal hydroxyl groups and having a molecular weight of from 400 to 15,000, which compounds comprise segments in their molecular structure corresponding to the following general formulae:

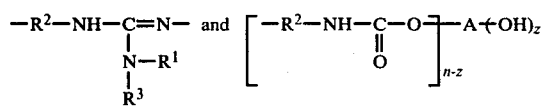

wherein
R$^1$ represents hydrogen or C$_1$–C$_{18}$ aliphatic, C$_4$–C$_{15}$ cycloaliphatic or C$_6$–C$_{15}$ aromatic or araliphatic radical which may optionally contain a double bond and/or be branched and which may optionally contain one or two substituents selected from the group consisting of hydroxyl, mercapto, secondary amino, sulphonic acid ester, phosphonic acid ester, carboxylic ester, siloxane, trifluoromethyl or nitrile groups, fluorine, chlorine, bromine or iodine or R$^1$ represents one of the radicals:

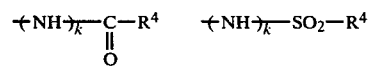

or R$^1$ together with R$^3$ and the nitrogen atom forms a 5- or 6 membered heterocyclic ring optionally containing as additional hetero atoms an oxygen atom or up to two nitrogen atoms;
R$^2$ represents a divalent aliphatic, cycloaliphatic, aromatic or araliphatic radical containing from 4 to 25 carbon atoms obtained by removing the isocyanate groups from a diisocyanate;

$R^3$ represents a monovalent or—in the form of a bridge to other guanidine groups—divalent or trivalent $C_1$-$C_{18}$ aliphatic, $C_4$-$C_{15}$ cycloaliphatic or $C_6$-$C_{15}$ aromatic or araliphatic radical which may optionally contain a double bond and/or be branched and which may optionally contain one or two substituents selected from the group of hydroxyl, alkoxyl, mercapto, secondary amino, sulphonic acid ester, phosphonic acid ester, carboxylic ester, siloxane, trifluoromethyl or nitrile groups, fluorine, chlorine, bromine or iodine; or one of the radicals:

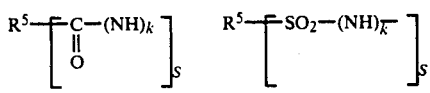

or together with $R^1$, the nitrogen atom and, optionally, the nitrogen atom of another guanidine group forms a 5-or 6-membered heterocyclic ring optionally containing as an additional hetero atom an oxygen or nitrogen atom;

$R^4$ represents an aliphatic, cycloaliphatic, araliphatic or aromatic radical containing from 1 to 15 carbon atoms;

$R^5$ represents an s-valent aliphatic cycloaliphatic, araliphatic or aromatic radical containing from 1 to 15 carbon atoms;

A represents an n-valent radical of the type obtained by removing the hydroxyl groups from a polyhydroxyl compound having a molecular weight of from 62 to 6000;

n represents an integer of from 2 to 8 s represents an integer of from 1 to 3;

z represents an integer having a value of from 0 to (n−1); and k represents 0 or 1.

* * * * *